United States Patent [19]
Livesay et al.

[11] Patent Number: 4,594,846
[45] Date of Patent: Jun. 17, 1986

[54] TRACK JOINT AND METHOD OF ASSEMBLING SAME

[75] Inventors: Richard E. Livesay; Charles E. Grawey, both of Peoria, Ill.

[73] Assignee: Caterpillar Tractor Co., Peoria, Ill.

[21] Appl. No.: 734,216

[22] Filed: May 16, 1985

Related U.S. Application Data

[63] Continuation-in-part of Ser. No. 615,629, May 31, 1984, abandoned.

[51] Int. Cl.$^4$ .............................................. B21L 9/00
[52] U.S. Cl. ......................................... 59/5; 59/35.1; 305/11; 384/121; 384/626; 29/434
[58] Field of Search ........................... 59/7, 8, 35.1, 84; 308/9.24, DIG. 7, DIG. 8, DIG. 9; 384/425, 427, 121; 305/11, 14; 277/DIG. 6, 165; 29/434, 149 B R, 149.5 C, 424

[56] References Cited

U.S. PATENT DOCUMENTS

| | | | |
|---|---|---|---|
| 3,191,264 | 6/1965 | Underwood et al. | 29/424 |
| 3,683,476 | 8/1972 | Leq et al. | 29/434 |
| 4,223,963 | 9/1980 | Glodin et al. | 29/149.5 R |

Primary Examiner—Lowell A. Larson
Assistant Examiner—David B. Jones
Attorney, Agent, or Firm—O. Gordon Pence

[57] ABSTRACT

A track joint is provided with a controlled running clearance by means of a controlled interstice producing membrane placed between the opposing axial thrust surfaces of the joint. The membrane is of a substance which sacrificially self-destructs upon the initial pivotal movements of the joint. The purpose of the membrane is to relieve the joint of compressive loads which become locked in the joint during its assembly and can cause galling of the thrust surfaces and injury to track seals in the joint.

10 Claims, 4 Drawing Figures

TRACK JOINT AND METHOD OF ASSEMBLING SAME

CROSS-REFERENCE TO RELATED APPLICATIONS

This application is a continuation-in-part of application Ser. No. 615,629, now abandoned, filed by Richard E. Livesay and David L. Baumann on May 31, 1984.

DESCRIPTION

1. Technical Field

This invention relates generally to endless track chains for track-type vehicles and, more particularly, to the pivot joints of such track chains.

2. Background Art

Endless track chains are used to support and propel track-type vehicles and are subjected to severe loads and an adverse environment in such use. Such track chains are constructed from a plurality of articulately coupled link sections, each having a pair of links, a pin, and a bushing. The pin of each link section is pivotally mounted through the bushing of the preceding link section so as to provide a hinge or pivot joint between each of the adjoining sections of the chain. Because of the adverse, highly abrasive environment in which track chain operates, it is highly advantageous to minimize internal wear by sealing and lubricating such hinge joints. The seals used to seal such joints are typically annular face type seals which are mounted within a seal cavity defined by a counterbore in the pin ends of the links, the adjoining end face of the bushing, and a thrust ring. One function of the thrust ring is to act as a spacer for limiting the inward movement of the pin links as they are pressed onto the ends of the pin during assembly. During such assembly, the links are pressed onto the pins until they are solid against the thrust rings which, in turn, are solid against the opposite ends of the bushing. This produces a tight joint, or a joint with no axial gaps between the assembled components of the joint. Those skilled in track art will appreciate that very large capacity hydraulic presses, presses of up to 300 ton capacity, are used to assemble the links onto their respective pins and bushings, the press fit connection therebetween being the principle means for retaining the track components together during operation.

Because of the high press forces used to assemble the track for retention purposes, there has been a tendency for the joints to become locked-up during the assembly process due to a retention in the joint of a compressive assembly load after the assembly is completed. The residual compressive load acting on the mating thrust surfaces of the joint may be of a sufficient magnitude to cause galling of such thrust surfaces and to generate sufficient frictional heat during the initial operation of the track joint to injure and even melt portions of the joint seals. Such damage to the track joint may lead to premature seal failure, loss of lubricant, and other deleterious affects, resulting in increased operating costs and downtime.

The present invention is directed to overcoming one or more of the problems set forth above.

DISCLOSURE OF THE INVENTION

In accordance with one aspect of the present invention, a track joint is provided with a controlled running clearance between opposing thrust surfaces of the joint by a method including the steps of applying a controlled interstice producing membrane to at least one of the thrust surfaces of the joint and then assembling the joint by exerting an axial compressive force sufficient to compressively load the membrane between relatively pivotal members of the joint. The membrane has a thickness of between 0.001 to 0.010 inches and of a material which is readily pulverizable by grinding.

Upon being ground away during the initial pivotal movements of the track joint, a controlled narrow interstice is provided between the thrust surfaces so as to unlock the joint and allow substantially free pivotal movement thereof during further operation of the joint.

BEST MODE FOR CARRYING OUT THE INVENTION

Figure 1:
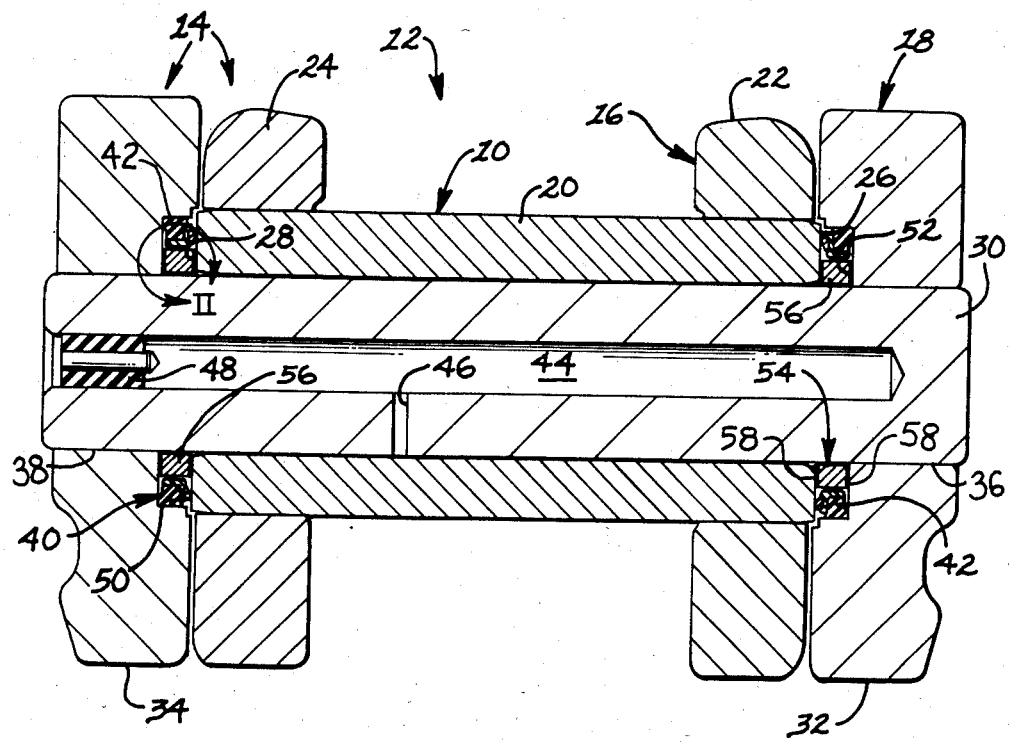
FIG. 1 is a cross-sectional view of a track chain joint embodying the principles of the present invention.

Referring more particularly to the drawings, a hinge or pivot joint 10 of an endless track chain 12 is depicted in cross-section in FIG. 1. A pair of such chains 12 are used to support and propel a track-type vehicle (not shown) and are subjected to severe loads and adverse environment in such use. Each track chain 12 is constructed from a plurality of like link sections 14, each having its opposite ends pivotally joined by a like plurality of pivot joints 10 to a succeeding and preceding link section. In FIG. 1, a bushing end 16 of one link section and a pin end 18 of another link section make up one of the pivot joints 10. Those skilled in the art will appreciate that each link section 14 has identical components. However, some of the same components in the adjoining sections shown in FIG. 1 are given different numbers herein for the sake of clarity. Bushing end 16 includes a bushing 20, a right-hand link 22, and a left-hand link 24. The links and bushing are connected together into a unitary structure by each of the links 22 and 24 being pressed onto a respective one of the opposite end portions of the bushing 20. The bushing 20 has opposite end faces 26 and 28, each of which serves as a sealing and thrust surface, as will hereinafter be more fully described.

Each pin end 18, as shown in FIG. 1, includes a pin 30, a right-hand link 32, and a left-hand link 34. Pin 30 is disposed through and pivotally mounted within the bushing 20. The opposite end portions 36,38 of the pin 30 extend from the bushing 20 and are pressably mounted within the links 32,34.

Means 40 for sealing and lubricating the joint 10 include a pair of seals 42 and a lubricant filled reservoir 44 in pin 30. A cross hole 46 communicates the reservoir 44 to the interface between the pin 30 and the bushing 20. The reservoir 44 is preferably closed by a plug 48.

Each seal 42 is disposed within an inwardly facing counterbore 50 provided in each of the links 32 and 34. Each counterbore 50 has a bottom wall 52 which is disposed in an opposing relationship to its respective bushing end face 26,28. Each bottom wall 52, like end faces 26,28, also serves as a thrust surface, as will hereinafter be described.

As further illustrated in FIG. 1, joint 10 also includes thrust means 54 for transferring axial loads which are exerted on the chain 12 during use between adjourning link sections 14 which are exerted on the chain during its operational use. Thrust means 54 also functions as a positive stop for positioning the links 32,34 as they are pressed onto the opposite end portions 36,38, respectively, of the pin 30 during assembly of the track chain. In sealed and lubricated track, as shown herein, the thrust means 54 also control the axial compression of the seals 42 which control is necessary for the proper functioning of the seals. In such a sealed and lubricated joint, this is customarily accomplished by use of a pair of annular spacers or thrust rings 56. One of the thrust rings 56 is concentrically disposed within each of the seals 42. Each thrust ring 56 has a thrust surface 58 at each end thereof. One of such thrust surfaces 58 is disposed in an opposing relationship with a respective one of the thrust surfaces 52 of the counterbore 50 and the other is disposed in an opposing relationship to a respective one of the thrust surfaces 26,28 of the bushing 20.

Figure 2:
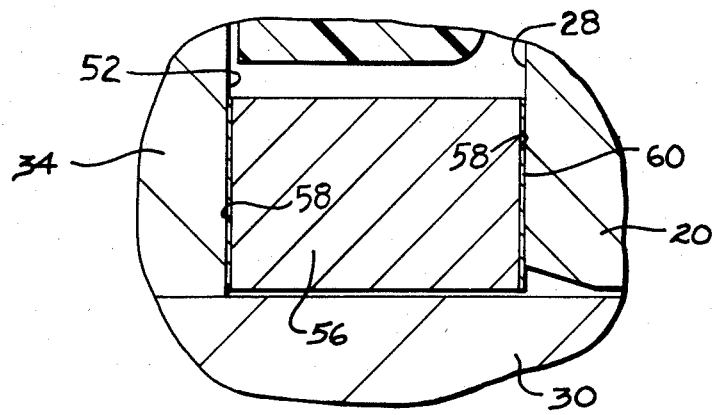
FIG. 2 is a greatly enlarged fragmentary sectional view illustrating the interstice producing membrane of the present invention immediately after the assembly of the joint.

In accordance with the present invention, a controlled interstice producing membrane 60 is interposed each set of opposing thrust surfaces for relieving the joint 10 of any residual compressive loads which may become locked-up in the joint during the assembly process. As best shown in FIG. 2, membrane 60 is preferably affixed to the thrust surfaces 58 of the thrust rings 56. Each membrane 60 is provided with a material thickness of between 0.001 to 0.010 inches (0.025 to 0.254 mm). The use of a membrane with a thickness of greater than 0.010 inches (0.254 mm) may create an undue amount of end play in the joint, as well as produce a sufficient amount of debris therein to prevent adequate access of lubricating oil to the seals. On the other hand, a membrane of a thickness less than 0.001 inches (0.025 mm) is not sufficient to reliably unlock the joint. A membrane 60 with a material thickness of between 0.003 to 0.005 inches (0.076 to 0.127 mm) has been found to be preferable, with a thickness of approximately 0.004 inches (0.102 mm) having been used with satisfactory results.

It is also desirable that the membrane 60 be of a material which is readily pulverizable by grinding to facilitate its disintegration upon the initial pivotal movement of the joint after assembly. A material which is relatively weak in shear is, therefore, preferred. While the membrane 60 is subjected to high compressive loads, sometimes as high as 130,000 psi, it has been discovered that a material with a similarly high compression modulus is not likewise required. This is believed to be because the member 60 is so thin, particularly in comparison to its compressible area, that material is not extruded from between the thrust surfaces when compressed, as would occur if it were much thicker.

Figure 4:
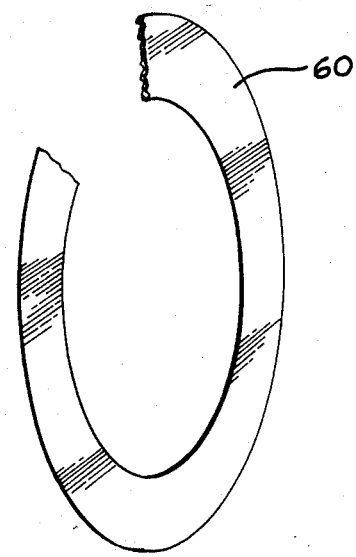
FIG. 4 is an isometric view of a ring membrane illustrating one of the preferred embodiments of the present invention.

As shown in FIG. 4, the membrane 60 is preferably in the form of a thin ring which is secured to each of the ends of the thrust rings by any suitable adhesive. In this form, a membrane made of a cellulose paper has been used with satisfactory results. The membrane 60 may also take the form of a thin coating covering the entire surface of the thrust ring. In this form, a coating of perfluoroalkoxy (PFA) has been used with satisfactory results. Such PFA coating may be applied to the thrust ring by any well-known process which provides sufficient adherence between the coating and the thrust ring and which produces a coating with a uniform thickness of between 0.003 to 0.004 inches.

INDUSTRIAL APPLICABILITY

Track joint 10 is preferably assembled by means of a track press (not shown) of any conventional design. As is well-known in the track art, such track presses are very powerful hydraulic devices, normally with a 150 to 200 ton capacity. Some newer track presses, however, have a 300 ton capacity. Thus, it is readily apparent that large compressive forces are exerted on the components of the track joint 10 during the assembly process which preferably occurs in the following sequence. First, the left and right-hand links 22,24 are pressably forced onto the opposite ends of the bushing 20 so as to form a unitary structure thereof. Second, the pin 30 is centrally placed within the bushing 20. A clearance fit is provided between the pin 30 and the bushing 20 to permit free pivotal movement therebetween. Third, the thrust ring 56 with the membranes 60 of the present invention attached thereto are placed about their respective pin end portions 36,38 which protrude from the opposite ends of the bushing 20. A seal 42 is mounted within the counterbore 50 of the links 32,34 prior to the links being positioned adjacent to their respective ends of the pin 30. By means of the track press, the links 32,34 are forced onto their respective pin end portions 36,38 until the joint becomes solid, e.g., there is no axial clearance between the links 32,34, thrust rings 56, and bushing 20.

In practice, the press force applied to the links 32,34 is much greater than the nominal force required to assemble such links onto the pin 30. The application of a greater than nominal force is required to insure proper assemblage of all joints, each of which may require a different assembly force due to variations in manufacturing tolerances and the like. For example, a particular joint may require a nominal assembly force of 60 tons, while an actual assembly force of 100 tons would be applied thereto to insure the complete assemblage of every link onto every pin 30 of a track chain.

Figure 3:
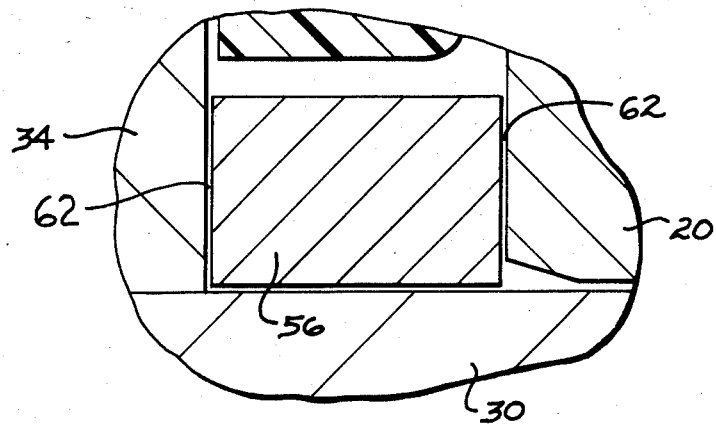
FIG. 3 is a view similar to FIG. 2, but after destruction of the membrane upon initial pivotal movement of the joint.

The application of this amount of excessive force on the joint can and frequently does produce a compressive load which becomes locked into the joint after the assembly process is completed. Such a residual load, due to friction between the mating thrust surfaces of the joint, restricts the normal free pivotal movement of the joint. If of sufficient magnitude, such compressive loads can cause galling of the thrust surfaces and generate sufficient frictional heat to injure, and possibly melt, the synthetic plastic materials of the seals in certain areas. The interstice producing membrane 60 of the present invention advantageously eliminates this residual compressive load in the joint, thereby eliminating the deleterious consequences thereof. This is accomplished by the membrane 60 sacrificially self-destructing upon the initial pivotal movements of the joint after the joint is assembled. The membrane 60, in effect, is pulverized, preferably into fine particles, by being ground between the thrust surfaces during such initial pivotal movements. The fine particles are then removed from between the thrust surfaces by entering into solution with or by being flushed away by the lubricating oil. The disappearance of the membrane 60 between the mating thrust surfaces of the joint produces a controlled interstice or running clearance 62, as shown in FIG. 3, between such thrust surfaces which is sufficient to unlock the joint and allow the free pivotal movement thereof. However, no significant looseness is produced in the joint upon the disappearance of the membrane 60 due to its minimally controlled thickness.

Other aspects, objects, and advantages of this invention can be obtained from a study of the drawings, the disclosure, and the appended claims.

We claim:

1. A method of providing a controlled running clearance between opposing thrust surfaces of a track joint, the joint having a first member pivotable relative to a second member thereof, comprising the steps of:

applying a controlled interstice producing membrane to at least one of the thrust surfaces of the joint, said membrane having a thickness of between 0.001 to 0.010 inches;

assembling said joint by exerting an axial compressive force sufficient to compressively load said membrane between said members; and grinding said membrane into fine particles upon initial pivotal movements of said joint after assembly and providing a controlled narrow interstice between said thrust surfaces sufficient to axially unlock the joint and allow substantially free pivotal movement of the joint thereafter.

2. The method of claim 1 wherein said track joint includes a thrust ring defining one of said thrust surfaces and wherein said step of providing a controlled interstice producing membrane includes affixing said membrane to said thrust ring at least over said thrust surface thereof.

3. The method of claim 2 wherein the step of affixing said membrane to said thrust ring includes applying a coating of perfluoroalkoxy to said thrust ring, said coating having a thickness in a range of from 0.001 to 0.004 inches.

4. The method of claim 2 wherein said membrane is a ring of paper of diametral size to cover said thrust surfaces and having a thickness of between 0.003 to 0.004 inches.

5. A track joint assembly, comprising:

a first member including a bushing, said bushing having a pair of outwardly facing thrust surfaces at the opposite ends thereof;

a second member including a pin and first and second links, said pin being pivotably receivable through said bushing and having opposite end portions extending outwardly from the opposite ends of said bushing, and said links being pressably receivable onto said opposite end portions of said pin, each link having an inwardly facing thrust surface disposed in an opposed relationship to a respective one of said thrust surfaces of said bushing; and annular spacer means interposed and in abutting engagement against each of the opposing sets of thrust surfaces for limiting the inward axial movement of said links upon exertion of a compressive assembly force on said links to press said links onto the end portions of the pin, said spacer means including a controlled interstice producing membrane, said membrane being of a material sufficiently weak in shear and pulverizable by grinding to self destruct during the initial pivotal movements of the joint and being of a sufficient thickness after the exertion of said compressive assembly force to substantially relieve the joint of any residual compressive loads after self destructing.

6. The track joint assembly of claim 5 wherein said spacer means includes a thrust ring having a thrust surface at each end thereof, each of said thrust surfaces having one of said membranes affixed thereto.

7. The track joint assembly of claim 6 including lubricant means and a seal disposed between each of said links and a respective one of said bushing ends for sealing lubricant within said joint assembly, and wherein said membrane is ground into fine particles.

8. The track joint assembly of claim 7 wherein said membrane is provided by a thin coating of perfluoroalkoxy covering said thrust rings.

9. The track joint assembly of claim 7 wherein said membrane is provided by a thin ring of paper affixed to each of said thrust surfaces of the thrust rings.

10. The track joint assembly of claim 5 wherein said spacer means provides an interstice within a range of from 0.001 to 0.010 inches upon the grinding away of said membrane.

* * * * *